United States Patent
Kim et al.

(10) Patent No.: US 10,832,126 B2
(45) Date of Patent: Nov. 10, 2020

(54) NEURON DEVICE AND INTEGRATED CIRCUIT INCLUDING NEURON DEVICE

(71) Applicant: SEOUL NATIONAL UNIVERSITY R&DB FOUNDATION, Seoul (KR)

(72) Inventors: Jaeha Kim, Seoul (KR); Yunju Choi, Incheon (KR); Joonseok Yang, Seoul (KR); Seungheon Baek, Gyeonggi-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 825 days.

(21) Appl. No.: 15/526,507

(22) PCT Filed: Oct. 1, 2015

(86) PCT No.: PCT/KR2015/010394
§ 371 (c)(1),
(2) Date: May 12, 2017

(87) PCT Pub. No.: WO2016/076534
PCT Pub. Date: May 19, 2016

(65) Prior Publication Data
US 2018/0300611 A1    Oct. 18, 2018

(30) Foreign Application Priority Data

Nov. 12, 2014 (KR) .......................... 10-2014-0157249
Aug. 7, 2015 (KR) .......................... 10-2015-0111673

(51) Int. Cl.
*G06N 3/063* (2006.01)
*G06N 3/04* (2006.01)

(52) U.S. Cl.
CPC ............. *G06N 3/063* (2013.01); *G06N 3/049* (2013.01); *G06N 3/0454* (2013.01); *G06N 3/0635* (2013.01)

(58) Field of Classification Search
CPC .......... G06N 3/02; G06N 3/04; G06N 3/0454; G06N 3/0472; G06N 3/063
See application file for complete search history.

(56) References Cited

U.S. PATENT DOCUMENTS

| | | | | |
|---|---|---|---|---|
| 4,951,239 | A | * 8/1990 | Andes | G06N 3/063 708/801 |
| 2002/0185690 | A1 | * 12/2002 | Ueda | G11C 27/005 257/368 |

(Continued)

FOREIGN PATENT DOCUMENTS

KR    10-2010-0085120 A    7/2010
KR      20100129741 A     12/2010

(Continued)

OTHER PUBLICATIONS

Yuminaka, Yasushi, et al. "Wave-parallel computing systems using multiple-valued pseudo-orthogonal sequences." Proceedings. 1998 28th IEEE International Symposium on Multiple-Valued Logic (Cat. No. 98CB36138). IEEE, 1998. (Year: 1998).*

(Continued)

*Primary Examiner* — Kamran Afshar
*Assistant Examiner* — Randall K. Baldwin
(74) *Attorney, Agent, or Firm* — Maschoff Brennan

(57) ABSTRACT

A neuron device may include an input unit, a synapse unit, and an output unit. The synapse unit can be connected with the input unit and may include one or more synapse modules. Each of the one or more synapse modules may include multiple synapse elements connected in series and may be configured to operate in a time division multiplexing mode. Each synapse element may have specific coefficient information. In each of the one or more synapse modules, one of the multiple synapse elements connected in series may be configured to apply coefficient information to one of the multiple input signals received by the input unit. The output (Continued)

unit may obtain a weighted sum of the multiple input signals and may generate an output signal based on the weighted sum.

17 Claims, 12 Drawing Sheets

(56) References Cited

U.S. PATENT DOCUMENTS

| | | | |
|---|---|---|---|
| 2009/0043722 A1* | 2/2009 | Nugent | G06N 3/084 706/25 |
| 2009/0250742 A1* | 10/2009 | Kinoshita | H01L 27/11521 257/319 |
| 2010/0198765 A1* | 8/2010 | Fiorillo | G06N 3/049 706/21 |
| 2010/0214936 A1* | 8/2010 | Ito | G06K 9/00986 370/252 |
| 2010/0241601 A1* | 9/2010 | Carson | G06N 3/02 706/27 |
| 2011/0004579 A1* | 1/2011 | Snider | G06N 3/049 706/25 |
| 2014/0025715 A1* | 1/2014 | Yang | G06F 17/10 708/131 |
| 2014/0067743 A1* | 3/2014 | Park | G06N 3/02 706/33 |
| 2014/0180987 A1* | 6/2014 | Arthur | G06N 3/049 706/25 |
| 2014/0241211 A1* | 8/2014 | Zhang | H04L 5/0023 370/255 |
| 2014/0344203 A1* | 11/2014 | Ahn | G06N 3/08 706/25 |

FOREIGN PATENT DOCUMENTS

| | | |
|---|---|---|
| KR | 10-2013-0090147 A | 8/2013 |
| KR | 10-1458004 B1 | 11/2014 |

OTHER PUBLICATIONS

Snider, Greg S. "Spike-timing-dependent learning in memristive nanodevices." 2008 IEEE international symposium on nanoscale architectures. IEEE, 2008: 85-92 (Year: 2008).*

International Search Report dated Jan. 12, 2016 in PCT Application No. PCT/KR2015/010394 (2 pages).

Greg S. Snider, "Spike-timing-dependent learning in memristive nanodevices", 2008 IEEE/ACM International Symposium on Nanoscale Architectures, Jun. 2008 (http://ieeexplore.ieee.org/) (8 pages).

Yasushi Yumenaka et al., "Wave-parallel computing systems using multiple-valued pseudo-orthogonal sequences", Multiple-Valued Logic, 1998 28th IEEE International Symposium on, May 1998 (http://ieeexplore.ieee.org/) (7 pages).

* cited by examiner

NEURON DEVICE AND INTEGRATED CIRCUIT INCLUDING NEURON DEVICE

TECHNICAL FIELD

The present disclosure relates to a neuron device and an integrated circuit including the same.

BACKGROUND

Recently, research on a system including a neuron device has continued. The system including a neuron device can implement a computer different from a conventional Von Neumann type computer and may have design flexibility and energy and space efficiency.

The system including a neuron device can process and learn data in a manner analogous to that of a biological brain. The neuron device is connected with other neuron devices through synapses of the neuron device and also receives data from the other neuron devices through the synapses. Also, the neuron device may store the received data. In order to configure a required system using the neuron device and/or the synapses of the neuron device, a number of neuron devices may be needed.

SUMMARY

In an example, a neuron device is generally described. One exemplary neuron device may include an input unit, a synapse unit, and an output unit. The input unit may be configured to receive multiple input signals. The synapse unit may be connected with the input unit and may include one or more synapse modules. Each of the one or more synapse modules of the synapse unit may include multiple synapse elements connected in series. Each of the synapse modules may be configured to operate in a time division multiplexing mode. Each of the multiple synapse elements may have specific coefficient information. According to the time division multiplexing mode, in each of the one or more synapse modules, one of the multiple synapse elements connected in series may be configured to apply coefficient information to one of the received multiple input signals. The output unit may obtain a weighted sum of the multiple input signals to which the coefficient information is applied and may generate an output signal based on the weighted sum. In an additional example, each synapse element of the synapse unit may include a floating gate metal oxide silicon field effect transistor (MOSFET).

In an additional example, the multiple input signals may be pulse signals. In another example, the multiple input signals may be analog signals. In yet another example, the multiple input signals may be digital signals.

Further, in an additional example, the input unit may be configured to receive an input signal in each time section according to the time division multiplexing mode. Each synapse element of the synapse unit may be configured to update the coefficient information in each time section according to the time division multiplexing mode. The output unit may be configured to generate an output signal in each time section according to the time division multiplexing mode.

In an additional example, the input unit may be configured to directly transmit an input signal to each synapse element. The input unit may be configured to transmit, according to the time division multiplexing mode, input signals to the other synapse elements than the synapse element applying the coefficient information, wherein the input signals to the other synapse elements is to operate the other synapse elements as closed switches.

In another example, the input unit may be configured to transmit an input signal to each synapse module. According to the time division multiplexing mode, in each of the one or more synapse modules, each of the synapse elements applying the coefficient information may receive a read signal that enables coefficient information to be read and apply the read coefficient information to an input signal transmitted to a corresponding synapse module. Meanwhile, in each of the one or more synapse modules, the other synapse elements than the synapse elements applying the coefficient information from among the multiple synapse elements connected in series may be configured to receive a pass signal to operate the other synapse elements as closed switches.

In an additional example, the output unit may be configured to generate an output signal when the weighted sum exceeds a threshold value. The coefficient information of each of the multiple synapse elements may have a positive value or a negative value.

In an additional example, the synapse elements connected in series may be configured to form a NAND flash structure.

In an example, an integrated circuit is generally described. The integrated circuit may include multiple neuron devices and a connection unit. Each of the multiple neuron devices may be configured as the above-described exemplary neuron device. The connection unit may be configured to enable interconnection among the multiple neuron devices. The connection unit is programmable. The connection unit may dynamically change the interconnection among the multiple neuron devices.

The above-described summary is for illustration purposes only and does not intend to limit in any ways. In addition to the illustrative embodiments, examples, and features described above, additional embodiments, examples, and features will become apparent by referring to the following detailed description and drawings.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the present disclosure and are not to be considered limiting of its scope, the present disclosure will be described with additional specificity and detail through use of the accompanying drawings.

MODE FOR CARRYING OUT THE INVENTION

Figure 1:
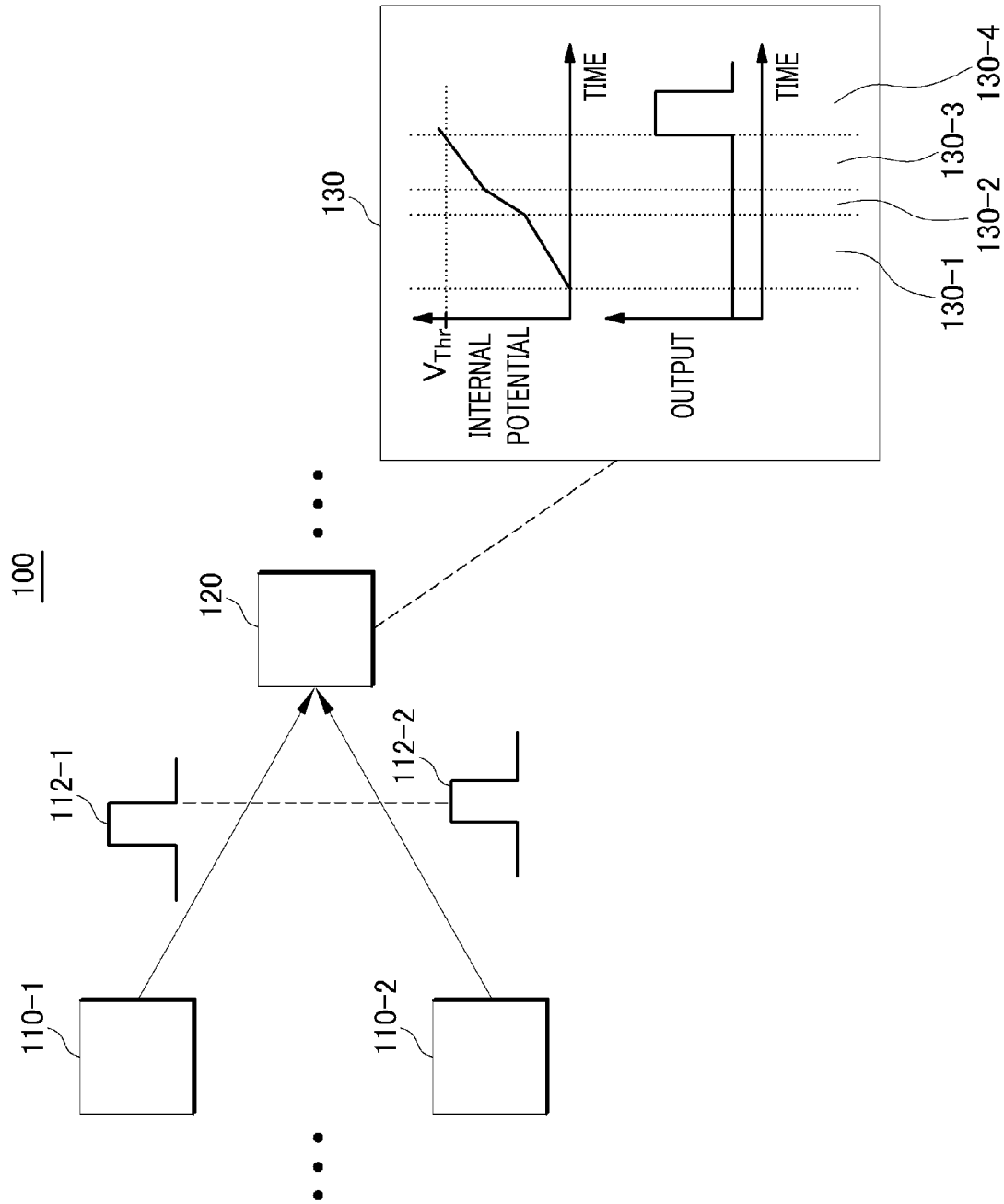
FIG. 1 is a diagram provided to explain signal transmission between neuron devices in an electronic device including the neuron devices in accordance with at least some exemplary embodiments of the present disclosure.

In the following detailed description, reference is made to the accompanying drawings, which constitutes a part of the present disclosure. In the drawings, similar symbols typically identify similar components unless context dictates otherwise. The illustrative embodiments described in the detailed description, drawings, and claims are not meant to be limiting. Other embodiments may be used and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

This disclosure is generally related, inter alia, to neuron devices and integrated circuits including multiple neuron devices.

Briefly stated, a neuron device may receive multiple input signals. The neuron device may include one or more synapse modules, and each of the synapse modules may include multiple synapse elements connected in series. In each of the one or more synapse modules, the multiple synapse elements connected in series may operate in a time division multiplexing mode. One of the multiple synapse elements connected in series may apply coefficient information to one of the input signals. The others of the multiple synapse elements connected in series may operate as a closed circuit.

In an example, each of the other synapse elements than the synapse element applying the coefficient information from among the multiple synapse elements connected in series may receive input signals to operate the other synapse elements as closed switches. In another example, each of the one or more synapse modules may receive one of the multiple input signals, and the synapse element applying the coefficient information may receive a read signal that enables coefficient information to be read and apply the coefficient information to the received input signal and the other synapse elements may receive a pass signal for a synapse element to operate as closed switches. The neuron device may obtain a weighted sum of the multiple input signals to which the coefficient information is applied and may generate an output signal based on the weighted sum.

FIG. 1 is a diagram provided to explain signal transmission between neuron devices in an electronic device including the neuron devices in accordance with at least some exemplary embodiments of the present disclosure. An exemplary electronic device 100 may include multiple neuron devices 110-1 and 110-2 and 120. In some examples, neuron device 110-1 may output a signal 112-1. Neuron device 110-2 may output a signal 112-2. In some examples, as illustrated in FIG. 1, signal 112-2 may have a time difference from the signal 112-1 of the neuron device 110-1. In another example, neuron device 120 may receive signals 112-1 and 112-2 at the same time. As such, neuron device 120 may receive signal 112-1 from neuron device 110-1 and signal 112-2 from neuron device 110-2.

As illustrated in FIG. 1, a graph 130 shows a change in internal potential and output of neutron device 120 when neuron device 120 receives signal 112-1 from neuron device 110-1 and signal 112-2 from neuron device 110-2. As shown in graph 130, during a time section 130-1, neuron device 120 receives only signal 112-1 and the internal potential of neuron device 120 is increased. During a time section 130-2, neuron device 120 receives all of signal 112-1 and signal 112-2 and the internal potential of neuron device 120 is rapidly increased as compared with time section 130-1. During a time section 130-3, neuron device 120 receives only signal 112-2 and the internal potential of neuron device 120 is slowly increased as compared with time section 130-2. When the internal potential of neuron device 120 exceeds a specific value $V_{Thr}$, neuron device 120 generates an output signal during a time section 130-4 as shown in the output graph.

As such, neuron device 120 may receive signals from neuron devices 110-1 and 110-2 and generate an output signal based on the received signal. In a similar manner as described above, neuron devices 110-1 and 110-2 may also receive signals from one or more other neuron devices and output the signals 112-1 and 112-2 based on the received signals. Although FIG. 1 illustrates that neuron device 120 receives signals from two neuron devices 110-1 and 110-2, neuron device 120 may receive signals from one neuron device or three or more neuron devices. Neuron devices 110-1, 110-2, and 120 may transmit, receive, and generate signals as described above and thus transfer information. Although FIG. 1 illustrates signals 112-1 and 112-2 as pulse signals, signals transmitted, received, and generated by the neuron devices may have various forms. For example, signals 112-1 and 112-2 may be analog signals and digital signals as well as pulse signals. If signals 112-1 and 112-2 are pulse signals, information may be expressed as pulse widths of the pulse signals. If signals 112-1 and 112-2 are analog signals, information may be expressed using magnitudes of voltage or currents of the analog signals. If signals 112-1 and 112-2 are digital signals, information may be expressed as one or more discrete values.

Figure 2A:
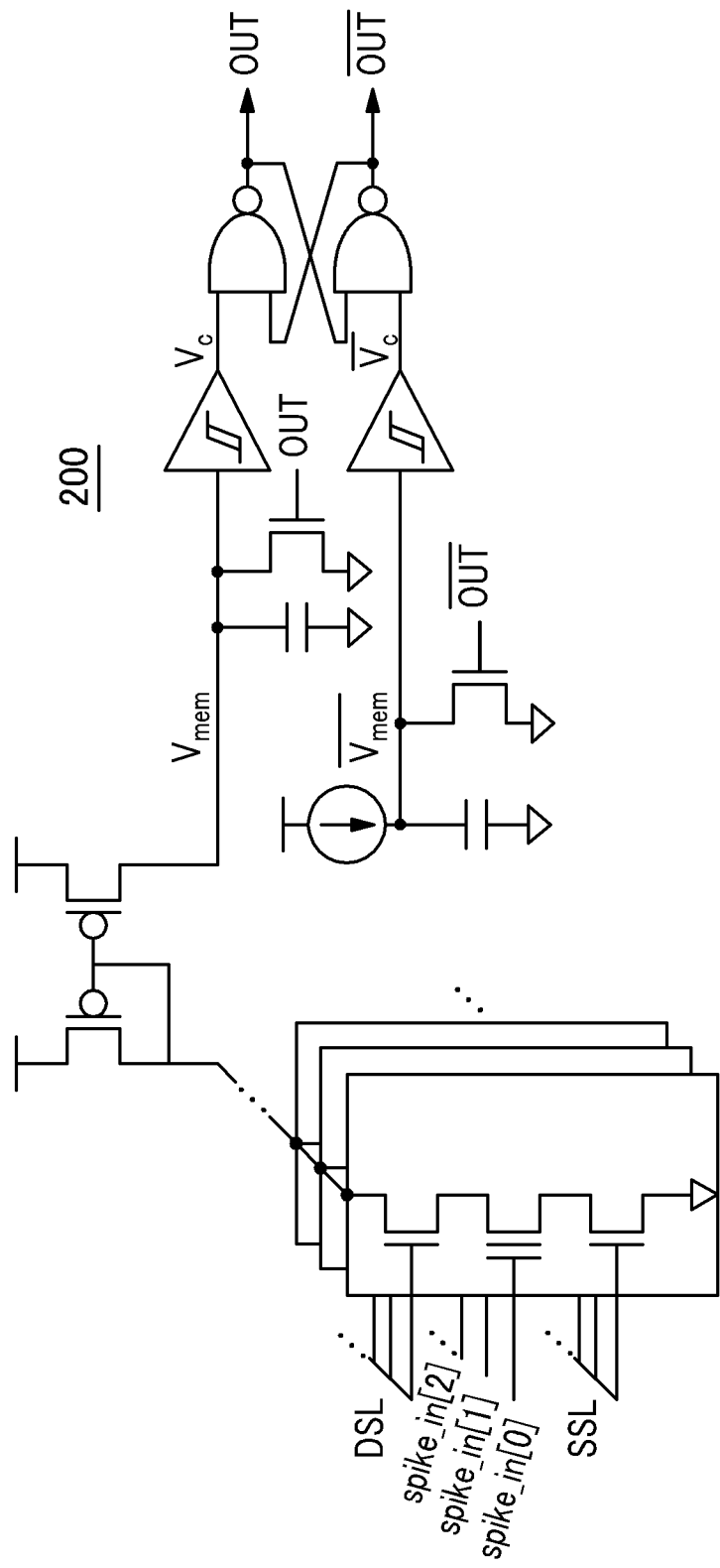
FIG. 2A is an exemplary circuit diagram in which the neuron devices of FIG. 1 are implemented.

FIG. 2A is an exemplary circuit diagram in which neuron devices such as neuron devices 110-1, 110-2, and 120 of FIG. 1 are implemented. A neuron device 200 is configured to receive multiple input signals such as spike_in[0], spike_in[1], spike_in[2], etc. Neuron device 200 may include a floating gate metal oxide silicon field effect transistor (FG MOSFET) as shown in FIG. 2A. DSL and SSL values may be associated with an effective operation of the FG MOSFET of the neuron device 200. Gates of the FG MOSFETs are configured to receive input signals such as spike_in[0], spike_in[1], spike_in[2], etc., respectively. When the neuron device 200 receives an input signal, an internal potential $V_{mem}$ of neuron device 200 is determined based on the received input signal. For example, when neuron device 200 receives the input signal spike_in[0], a charge is accumulated in a capacitor connected to a $V_{mem}$ stage, and, thus, the internal potential $V_{mem}$ may be increased. As described above with reference to FIG. 1, when the internal potential $V_{mem}$ of neuron device 200 exceeds a threshold value (e.g., Vth; not illustrated), neuron device 200 generates an output signal OUT. Meanwhile, when the output signal is generated by neuron device 200, the output signal OUT is applied to a gate of the MOSFET connected to the $V_{mem}$ stage, and, thus, the internal potential $V_{mem}$ is initialized.

Figure 2B:
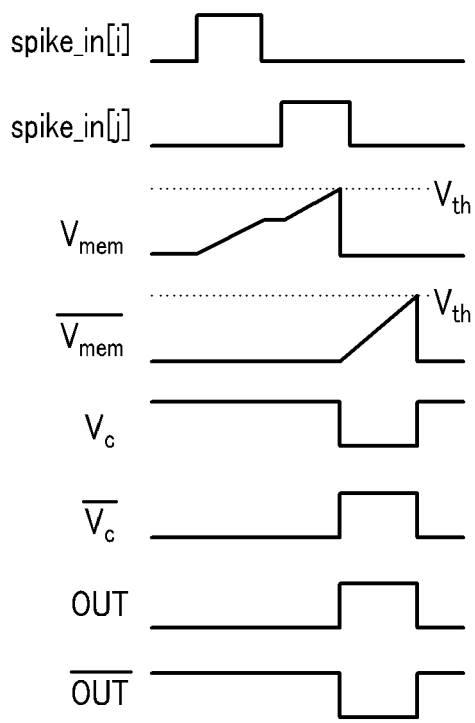
FIG. 2B is a graph showing the relationship of input signals applied to the neuron device of FIG. 2A, internal potentials, and output signals.

FIG. 2B is a graph showing the relationship of input signals applied to the neuron device 200 of FIG. 2A, internal potentials, and output signals. Neuron device 200 may receive an input signal spike_in[i] and an input signal spike_in[j]. For example, in an example illustrated in FIG. 2A, i may be 0 and j may be 1. When the input signal spike_in[i] is received as shown in FIG. 2B, the internal potential $V_{mem}$ is increased but lower than the threshold value Vth, and, thus, the output OUT is not generated. After the input signal spike_in[i] is received and before the input signal spike_in[j] is received, the internal potential $V_{mem}$ is not changed. When the input signal spike_in[j] is received, the internal potential $V_{mem}$ is increased again. When the internal potential $V_{mem}$ exceeds the threshold value Vth, the output signal OUT is generated and the generated output signal OUT is applied to the gate of the MOSFET connected to the $V_{mem}$ stage. Thus, the internal potential $V_{mem}$ is reset. Therefore, even if the input signal spike_in[j] is continuously received, the internal potential $V_{mem}$ is not further increased.

Figure 3:
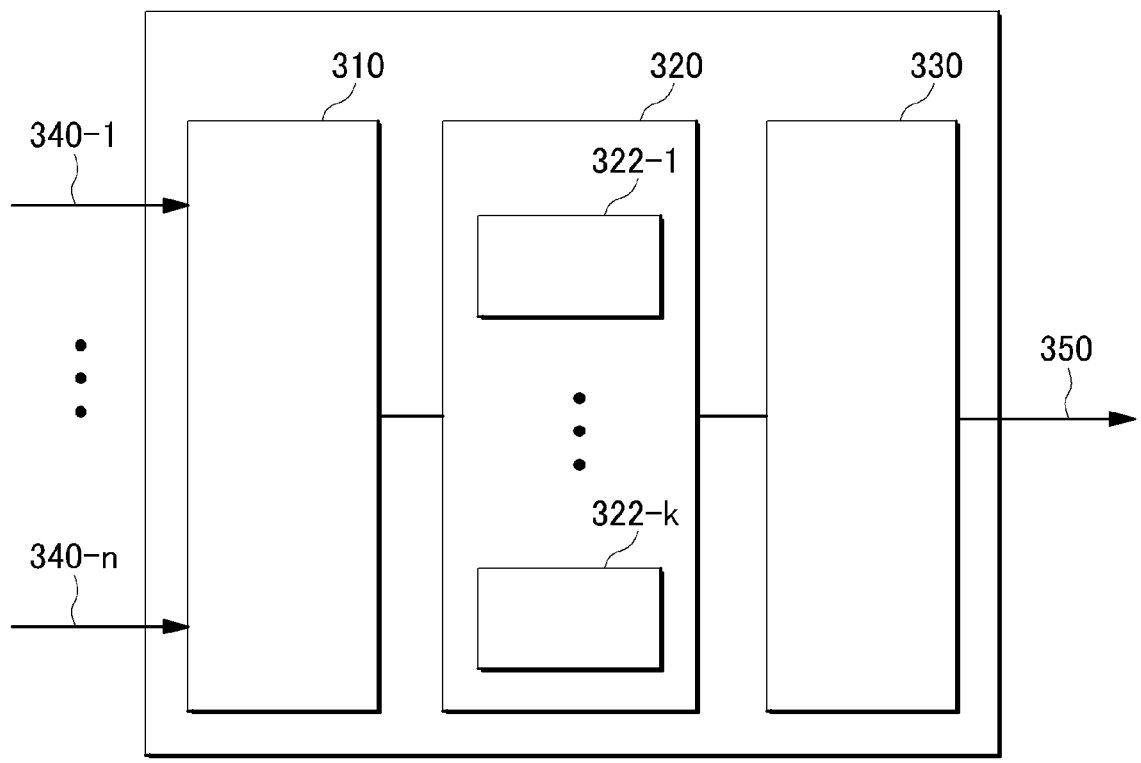
FIG. 3 is a block diagram illustrating an exemplary neuron device in accordance with at least some exemplary embodiments of the present disclosure.

FIG. 3 is a block diagram illustrating an exemplary neuron device in accordance with at least some exemplary embodiments of the present disclosure. In some examples, a neuron device 300 may include an input unit 310, a synapse unit 320, and an output unit 330. Input unit 310 may be configured to receive multiple input signals 340-1 to 340-n. In some examples, the multiple input signals 340-1 to 340-n received by input unit 310 may include various forms of signals. For example, the input signals 340-1 to 340-n may include pulse signals, analog signals, and digital signals. If the input signals 340-1 to 340-n are pulse signals, information included in each input signal may be expressed as pulse widths of the pulse signals. If the input signals 340-1 to 340-n are analog signals, information included in each input signal may be expressed using magnitudes of voltage or currents of the analog signals. If the input signals 340-1 to 340-n are digital signals, information included in each input signal may be expressed as one or more discrete values.

In some embodiments, synapse unit 320 may be connected to input unit 310 and may include one or more synapse modules 322-1 to 322-k. Each of one or more synapse modules 322-1 to 322-k may include multiple synapse elements connected in series. Each of the synapse elements may have specific coefficient information. In some examples, a synapse element may include an FG MOSFET. In such examples, the specific coefficient information may be determined based on a threshold voltage of the FG MOSFET in each synapse element, connection between synapse unit 320 and output unit 330, and the like. For example, synapse module 322-1 and synapse module 322-k may include j synapse elements and l synapse elements, respectively, and the synapse elements of synapse module 322-1 may have coefficient information $w_{11}$, $w_{12}$, $w_{13}$, ..., $w_{1j}$, respectively, and the synapse elements of synapse module 322-k may have coefficient information $w_{k1}$, $w_{k2}$, $w_{k3}$, ..., $w_{kl}$, respectively. Herein, j and l are positive integers equal to or greater than 2.

In an example where a synapse element includes an FG MOSFET, synapse elements may be connected in series to form a NAND flash structure. As multiple FG MOSFETs are connected in series and form a NAND flash structure, when fabricating neuron device 300 with connecting synapse elements in series, the number of synapse elements included in a unit area can be increased.

In some embodiments, each of one or more synapse modules 322-1 to 322-k may be configured to operate in a time division multiplexing manner. The multiple synapse elements connected in series in each of one or more synapse modules 322-1 to 322-k may be configured to operate in the time division multiplexing mode. Each of the multiple synapse elements connected in series may be configured to operate in a different time section from each other. For example, synapse unit 320 may include synapse module 322-1 and synapse module 322-k, and synapse module 322-1 may include a first synapse element and a second synapse element connected in series and synapse module 322-k may include a third synapse element and a fourth synapse element connected in series. In such example, during a first time section according to the time division multiplexing mode, input unit 310 may receive multiple input signals 340-1 to 340-n. During the first time section, each of the first synapse element of synapse module 322-1 and the third synapse element of synapse module 322-k may be configured to apply specific coefficient information to one of multiple input signals 340-1 to 340-n received by input unit 310. Meanwhile, during the first time section, the second synapse element and the fourth synapse element may operate as closed switches.

During a second time section after the first time section, input unit 310 may receive new multiple input signals 340-1' to 340-n' (not illustrated). The first synapse element and the third synapse element may operate as closed switches. Meanwhile, during the second time section, the second synapse element and the fourth synapse element may be configured to apply specific coefficient information to one of input signals 340-1' to 340-n' received during the second time section.

In some examples, each of the first and third synapse elements may be configured to apply coefficient information to an input signal during the first time section, and then the first to fourth synapse elements may be configured to update coefficient information before the second time section. Similarly, each of the second and fourth synapse elements may receive input signals during the second time section, and then the first to fourth synapse elements may be configured to update coefficient information before a subsequent time section. The time division multiplexing mode will be described below in more detail with reference to FIG. 8 and FIG. 10.

In some embodiments, output unit 330 may be connected to synapse unit 320 and configured to generate an output signal 350. In some examples, output unit 330 may be configured to obtain a weighted sum of input signals to which coefficient information is applied by synapse unit 320 and generate an output signal based on the weighted sum. In some examples, output unit 330 may be configured to output an output signal when the weighted sum exceeds a predetermined threshold value. Even when input unit 310 receives an input signal and the synapse unit applies coefficient information to the received input signal, when a weighted sum obtained by the output unit 330 does not exceed the threshold value, the output unit 330 may not generate an output signal. In some examples, when the synapse unit 320 operates in the time division multiplexing mode, the output unit 330 may be configured to generate an output signal during each time section according to the time division multiplexing mode. In some examples, the weighted sum obtained by the output unit 330 may be reset in each time section. The output signal generated by output unit 330 may be an input signal of one or more other neuron devices or a synapse element in another stage.

Figure 4:
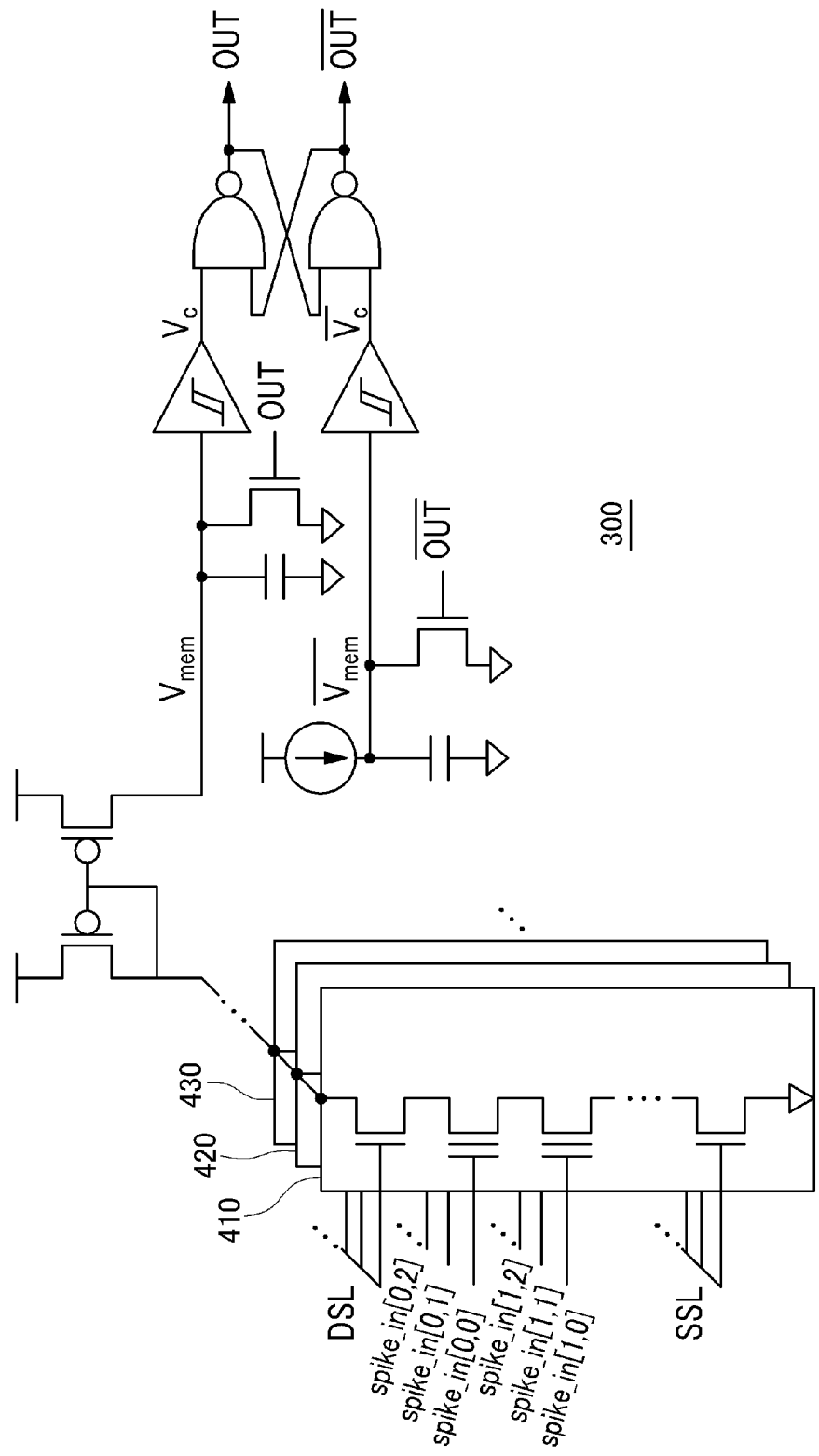
FIG. 4 is an exemplary circuit diagram of the neuron device of FIG. 3.

FIG. 4 is an exemplary circuit diagram of the neuron device of FIG. 3. An input unit (not illustrated) of neuron device 300 may be configured to receive multiple input signals spike_in[0,0], spike_in[0,1], spike_in[0,2], spike_in[1,0], spike_in[1,1], spike_in[1,2], etc. and transfer the multiple input signals to gates of multiple FG MOSFETs, respectively. As shown in FIG. 4, a synapse unit of neuron device 300 may include one or more synapse modules 410, 420, 430, etc. and each of synapse modules 410, 420, 430, etc. may include multiple FG MOSFETs connected in series. Each FG MOSFET may correspond to a synapse element. DSL and SSL values may be associated with an effective operation of the FG MOSFET of the neuron device 300. Synapse module 410 may be configured to receive spike_in[0,0] and spike_in[1,0]. Synapse module 420 may be configured to receive spike_in[0,1] and spike_in[1,1]. Synapse module 430 may be configured to receive spike_in[0,2] and spike_in[1,2]. When neuron device 300 receives an input signal, an internal potential $V_{mem}$ of neuron device 300 is determined based on the received input signal. For example, when neuron device 300 receives the input signal spike_in[0,0], a charge is accumulated in a capacitor connected to a $V_{mem}$ stage, and, thus, the internal potential $V_{mem}$ may be increased. In some examples, when the internal potential $V_{mem}$ exceeds a predetermined threshold value, the neuron device 300 may generate an output signal OUT.

In some embodiments, each of synapse modules 410, 420, and 430 of neuron device 300 may be configured to operate in the time division multiplexing mode. In some examples, during a first time section in the time division multiplexing mode, an FG MOSFET in a first stage of synapse module 410 may be configured to receive spike_in[0,0], and the other FG MOSFETs in synapse module 410 than the FG MOSFET receiving spike_in[0,0] may receive input signals to operate as closed switches. Similarly, during the first time section, an FG MOSFET in a first stage of synapse module 420 may be configured to receive spike_in[0,1] and an FG MOSFET in a first stage of synapse module 430 may be configured to receive spike_in[0,2]. The other FG MOSFETs in synapse modules 420 and 430 than the FG MOSFETs in the first stages of synapse modules 420 and 430 may receive input signals to operate as closed switches. When spike_in[0,0], spike_in[0,1], and spike_in[0,2] are received during the first time section, specific coefficient information of the respective FG MOSFETs may be applied thereto, and, thus, charges corresponding thereto may be accumulated in capacitors connected to the $V_{mem}$ stage. When a voltage of the internal potential $V_{mem}$ exceeds the threshold value, an output unit of neuron device 300 may generate the output signal OUT. During a second time section after the first time section, an FG MOSFET in a second stage of the synapse module 410 may receive spike_in[1,0], an FG MOSFET in a second stage of the synapse module 420 may receive spike_in[1,1], and an FG MOSFET in a second stage of the synapse module 430 may receive spike_in[1,2]. During the second time section, the FG MOSFETs in the first stages of synapse modules 410, 420, and 430 may receive input signals to operate as closed switches. During the second time section, when spike_in[1,0], spike_in[1,1], and spike_in[1,2] are received, specific coefficient information of the respective FG MOSFETs may be applied thereto, and, thus, charges corresponding thereto may be accumulated in capacitors connected to the $V_{mem}$ stage. When a voltage of the internal potential $V_{mem}$ exceeds the threshold voltage, the output unit of neuron device 300 may generate the output signal OUT.

Figure 5:
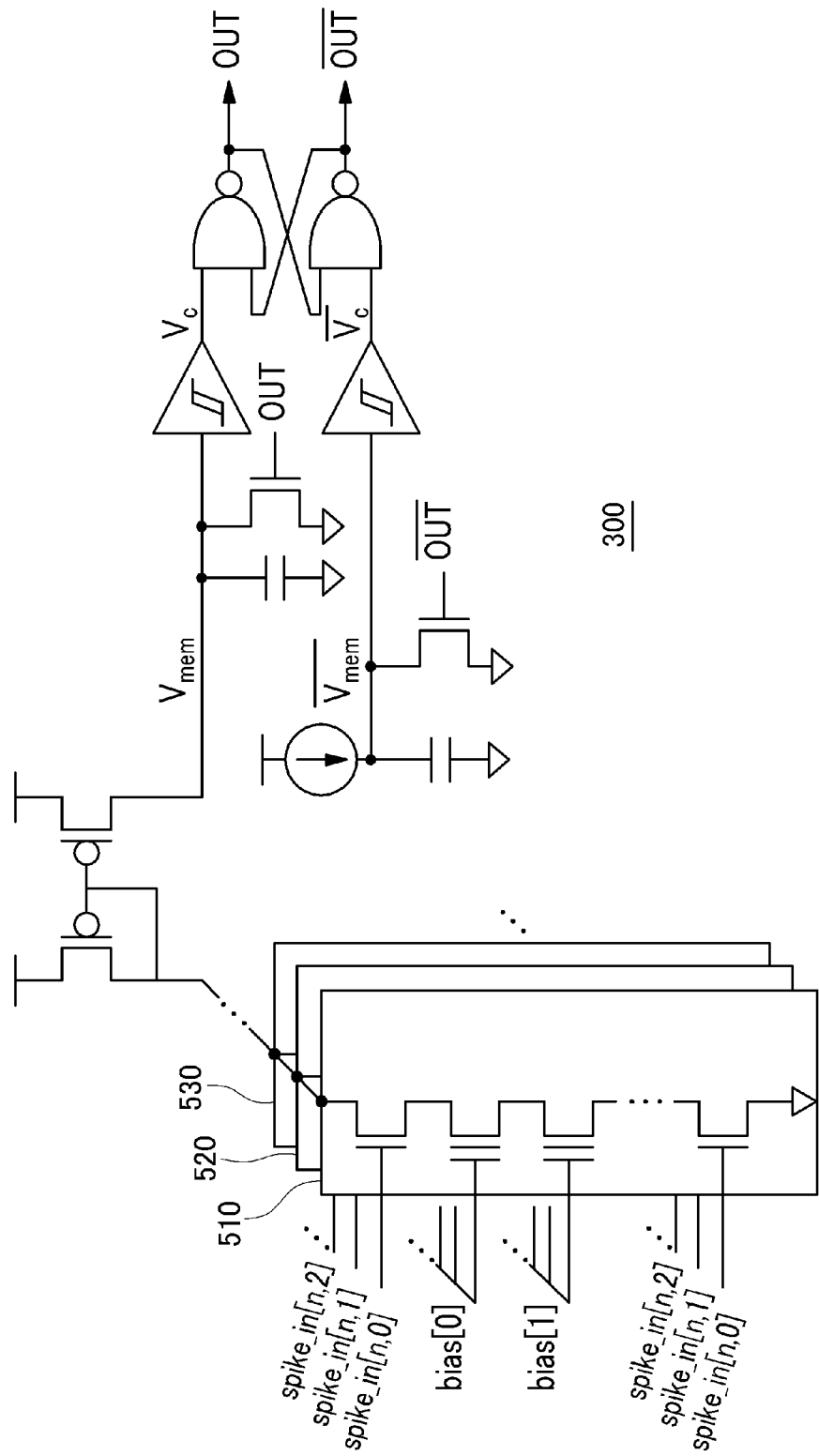
FIG. 5 is another exemplary circuit diagram of the neuron device of FIG. 3.

FIG. 5 is another exemplary circuit diagram of the neuron device of FIG. 3. The neuron device illustrated in FIG. 5 has the same circuit diagram as neuron device 300 illustrated in FIG. 4 except the layout of lines for input signals. Therefore, an explanation of the same parts as illustrated in FIG. 4 will be omitted. Referring to FIG. 5, a synapse unit of neuron device 300 includes one or more synapse modules 510, 520, 530, etc. An input unit (not illustrated) of neuron device 300 may be configured to receive multiple input signals spike_in[n,0], spike_in[n,1], spike_in[n,2], etc. and transmit the input signals to the respective synapse modules 510, 520, 530, etc. As illustrated in FIG. 5, the input signals spike_in[n,0], spike_in[n,1], spike_in[n,2], etc. may be transmitted to gates of MOSFETs included in synapse modules 510, 520, 530, etc., respectively. Herein, n includes 0 and positive integers. Two MOSFETs in each of the synapse modules illustrated in FIG. 5 may be arranged to receive the same input signal.

Further, each of multiple FG MOSFETs included in each of multiple modules 510, 520, 530, etc. may receive a signal indicating whether or not to read. For example, as illustrated in FIG. 5, FG MOSFETs in first stages of multiple modules 510, 520, 530, etc., respectively, may receive a signal bias[0], and FG MOSFETs in second stages of multiple modules 510, 520, 530, etc., respectively, may receive a signal bias[1]. Due to this layout of lines, lines may be simply arranged as compared with the circuit illustrated in FIG. 4, and, thus, signals in the circuit may be simplified.

In some embodiments, each of synapse modules 510, 520, 530, etc. of neuron device 300 illustrated in FIG. 5 may be configured to operate in the time division multiplexing mode. During a first time section in the time division multiplexing mode, synapse modules 510, 520, 530, etc. may be configured to receive spike_in[0,0], spike_in[0,1], and spike_in[0,2], respectively. Referring to FIG. 5, during the first time section, an MOSFET of the synapse module 510 may be configured to receive spike_in[0,0]. Similarly, during the first time section, MOSFETs of synapse modules 520 and 530 may be configured to receive spike_in[0,1] and spike_in[0,2], respectively. During the first time section, FG MOSFETs in first stages of synapse modules 510, 520, 530, etc. may receive a read signal such as bias[0]=$V_{read}$. The read signal $V_{read}$ may be a value suitable for reading information stored in a floating gate. During the first time section, FG MOSFETs in second stages of synapse modules 510, 520, 530, etc. may receive a pass signal such as bias[1]=$V_{pass}$. The pass signal $V_{pass}$ may be a value for an FG MOSFET to operate as a closed switch regardless of the information stored in the floating gate of the FG MOSFET. During the first time section, FG MOSFETs in the other stages than the FG MOSFETs in the first stages may operate as closed switches like the FG MOSFETs in the second stages. During a second time section after the first time section, the MOSFETs of synapse modules 510, 520 and 530 may receive spike[1,0], spike_in[1,1], and spike_in[1,2], respectively. During the second time section, the FG MOSFETs in the first stages of synapse modules 510, 520, 530, etc. may receive bias[0]=$V_{pass}$. Meanwhile, the FG MOSFETs in the second stages may receive bias[1]=$V_{read}$. During the second time section, FG MOSFETs in the other stages than the FG MOSFETs in the second stages may operate as closed switches like the FG MOSFETs in the first stages.

Figure 6:
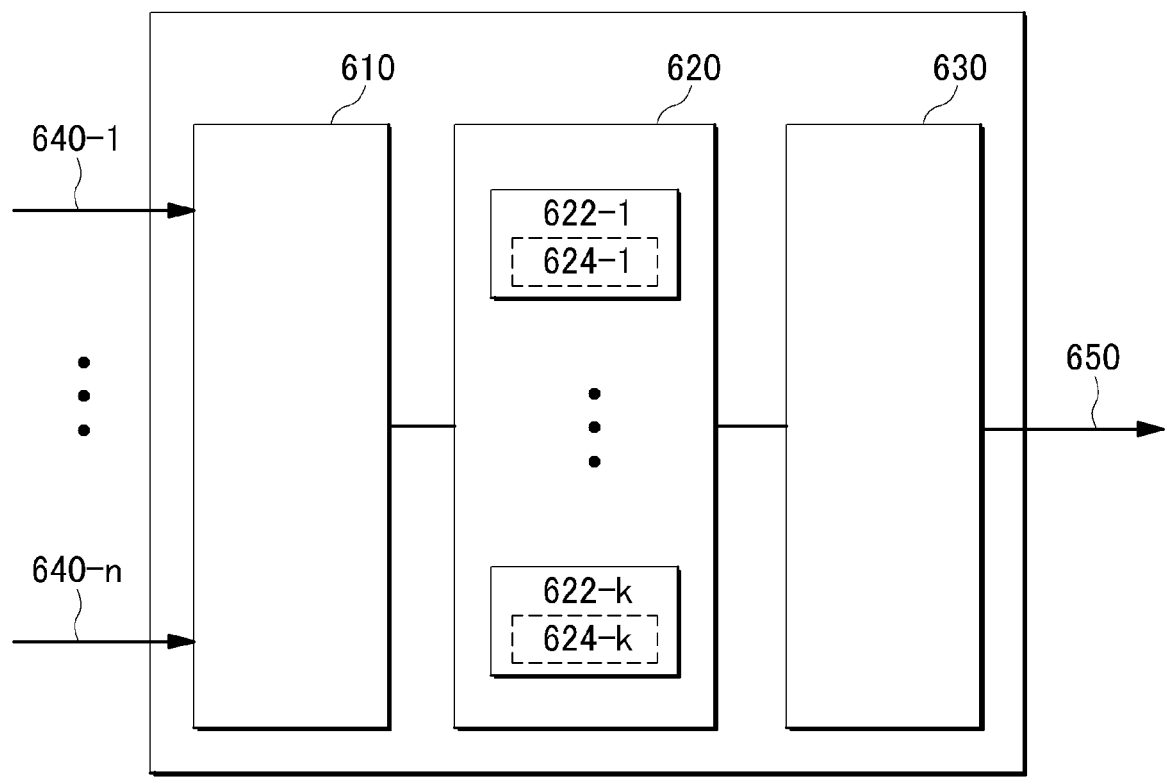
FIG. 6 is a block diagram illustrating another exemplary neuron device in accordance with at least some exemplary embodiments of the present disclosure.

FIG. 6 is a block diagram illustrating another exemplary neuron device in accordance with at least some exemplary embodiments of the present disclosure. In some embodiments, a neuron device 600 may include an input unit 610, a synapse unit 620, and an output unit 630. Input unit 610 may be configured to receive multiple input signals 640-1 to 640-$n$. In some examples, multiple input signals 640-1 to 640-$n$ received by input unit 610 may include various forms of signals. For example, the input signals 640-1 to 640-$n$ may include pulse signals, analog signals, and digital signals.

In some embodiments, synapse unit 620 may be connected to input unit 610 and may include one or more synapse modules 622-1 to 622-$k$. In some examples, each of one or more synapse modules 622-1 to 622-$k$ may include multiple synapse elements connected in series. Each synapse element may include an FG MOSFET. Synapse modules 622-1 to 622-$k$ operate in a similar manner as synapse modules 322-1 to 322-$k$ illustrated in FIG. 3. Therefore, a detailed explanation of the same parts will be omitted. In addition, as illustrated in FIG. 6, the multiple synapse elements in each of the one or more synapse modules 622-1 to 622-$k$ may further include additional FG MOSFETs 624-1 to 624-$k$.

Each of the multiple synapse elements may have specific positive coefficient information or specific negative coefficient information by the additional FG MOSFET. In some examples, the specific positive coefficient information and negative coefficient information may be determined based on a threshold voltage of an FG MOSFET of each synapse element and/or connection between synapse unit 620 and output unit 630. In some examples, one of the multiple synapse elements connected in series in one or more synapse modules 622-1 to 622-$k$ may operate to apply the positive coefficient information or the negative coefficient information to one of the multiple input signals 640-1 to 640-$n$. For example, one of the multiple synapse elements in synapse module 622-1 may have coefficient information w1 and additional FG MOSFET 624-1 of the synapse element may have coefficient information −w1'. In an example, one of the multiple synapse elements in synapse module 622-1 may apply the positive coefficient information w1 or the negative coefficient information −w1' to the input signal 640-1 received by input unit 610.

In some embodiments, each of one or more synapse modules 622-1 to 622-$k$ may be configured to operate in the time division multiplexing mode. The operation of synapse modules 622-1 to 622-$k$ in the time division multiplexing mode is the same as illustrated in FIG. 3 except that the multiple synapse elements connected in series in each of synapse modules 622-1 to 622-$k$ may apply negative coefficient information to an input signal through the additional FG MOSFETs. Therefore, an explanation thereof will be omitted for clarity.

Figure 7:
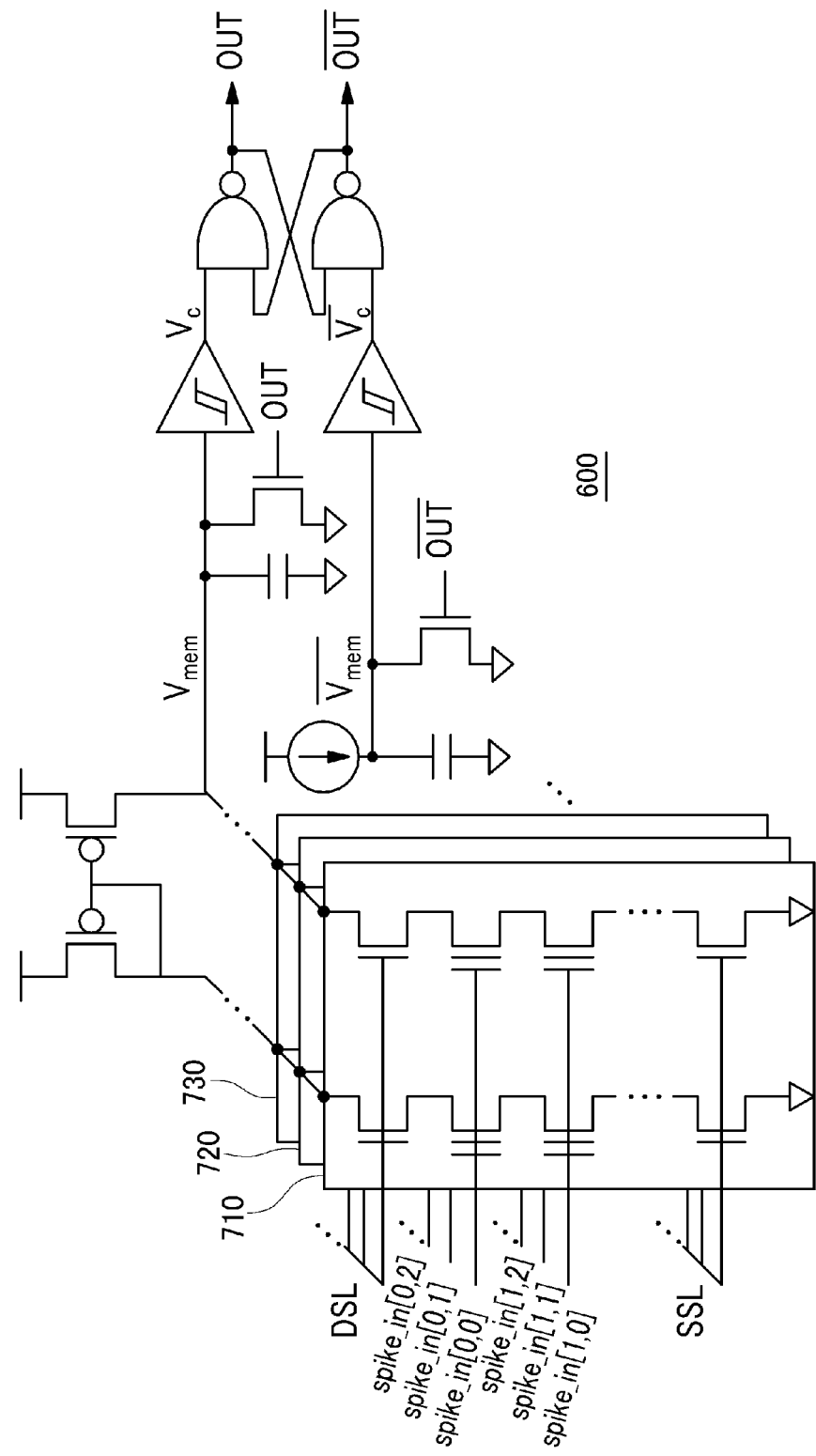
FIG. 7 is an exemplary circuit diagram of the neuron device of FIG. 6.

FIG. 7 is an exemplary circuit diagram of the neuron device of FIG. 6. An input unit (not illustrated) of neuron device 600 may be configured to receive multiple input signals spike_in[0,0], spike_in[0,1], spike_in[0,2], spike_in[1,0], spike_in[1,1], spike_in[1,2], etc. and transfer the multiple input signals to gates of multiple FG MOSFETs, respectively. As shown in FIG. 7, a synapse unit of neuron device 600 may include one or more synapse modules 710, 720, 730, etc. and each of synapse modules 710, 720, 730, etc. may include multiple FG MOSFETs connected in series. As compared with those of FIG. 3, each of synapse modules 710, 720, 730, etc. may further include multiple FG MOSFETs sharing an input with the multiple FG MOSFETs connected in series, and the additional FG MOSFETs are connected in series with each other. An FG MOSFET and an additional FG MOSFET in each stage of each of synapse modules 710, 720, 730, etc. may correspond to multiple synapse elements, respectively. DSL and SSL values may be associated with an effective operation of the FG MOSFET of neuron device 600. As illustrated in FIG. 7, synapse module 710 may be configured to receive spike_in[0,0] and spike_in[1,0]. Synapse module 720 may be configured to receive spike_in[0,1] and spike_in[1,1]. Synapse module 730 may be configured to receive spike_in[0,2] and spike_in[1,2]. When neuron device 600 receives an input signal, an internal potential $V_{mem}$ of neuron device 600 is determined based on the received input signal. For example, when neuron device 600 receives the input signal spike_in[0,0], the input signal spike_in[0,0] may be effectively applied to one of an FG MOSFET on the left or an FG MOSFET on the right. When the input signal spike_in[0,0] is effectively applied to the FG MOSFET on the left, a charge is accumulated in a capacitor connected to a $V_{mem}$ stage, and, thus, the internal potential $V_{mem}$ may be increased. Meanwhile, when the input signal spike_in[0,0] is effectively applied to the FG MOSFET on the right, the charge accumulated in the capacitor connected to the $V_{mem}$ stage is discharged, and, thus, the internal potential $V_{mem}$ may be decreased. In some examples, when the internal potential $V_{mem}$ exceeds a predetermined threshold value, an output unit of neuron device 600 may generate an output signal OUT.

In some embodiments, each of synapse modules 710, 720, and 730 of neuron device 600 may be configured to operate in the time division multiplexing mode. In some examples, during a first time section in the time division multiplexing mode, an FG MOSFET in a first stage of the synapse module 710 may be configured to receive spike_in[0,0], and the other FG MOSFETs than the FG MOSFET in the first stage may receive input signals to operate as closed switches. Similarly, during the first time section, an FG MOSFET in a first stage of synapse module 720 may be configured to receive spike_in[0,1] and an FG MOSFET in a first stage of synapse module 730 may be configured to receive spike_in [0,2]. The other FG MOSFETs in synapse modules 720 and 730 than the FG MOSFETs in the first stages of synapse modules 720 and 730 may receive input signals to operate as closed switchwa switches. When spike_in[0,0], spike_in [0,1], and spike_in[0,2] are received during the first time section, specific coefficient information of the respective FG MOSFETs may be applied thereto, and, thus, charges corresponding thereto may be accumulated in capacitors connected to the $V_{mem}$ stage or discharged. For example, when an input signal is effectively received by an FG MOSFET on the left, the internal potential $V_{mem}$ may be increased, and when an input signal is effectively received by an FG MOSFET on the right, the internal potential $V_{mem}$ may be decreased. When a voltage of the internal potential $V_{mem}$ exceeds the threshold value, the output unit of neuron device 600 may generate the output signal OUT. During a second time section after the first time section, an FG MOSFET in a second stage of the synapse module 710 may receive spike_in[1,0], an FG MOSFET in a second stage of synapse module 720 may receive spike_in[1,1], and an FG MOSFET in a second stage of synapse module 730 may receive spike_in[1,2]. The other FG MOSFETs than the FG MOSFETs in the second stages of synapse modules 720 and 730 may receive input signals to operate as closed switches. When spike_in[1,0], spike_in[1,1], and spike_in[1,2] are received during the second time section, specific coefficient information of the respective FG MOSFETs may be applied thereto, and, thus, charges corresponding thereto may be accumulated in capacitors connected to the $V_{mem}$ stage or discharged. When the internal potential $V_{mem}$ exceeds the threshold value, the output unit of neuron device 500 may generate the output signal OUT. The operation in the time division multiplexing mode will be described below in more detail with reference to FIG. 8.

Figure 8:
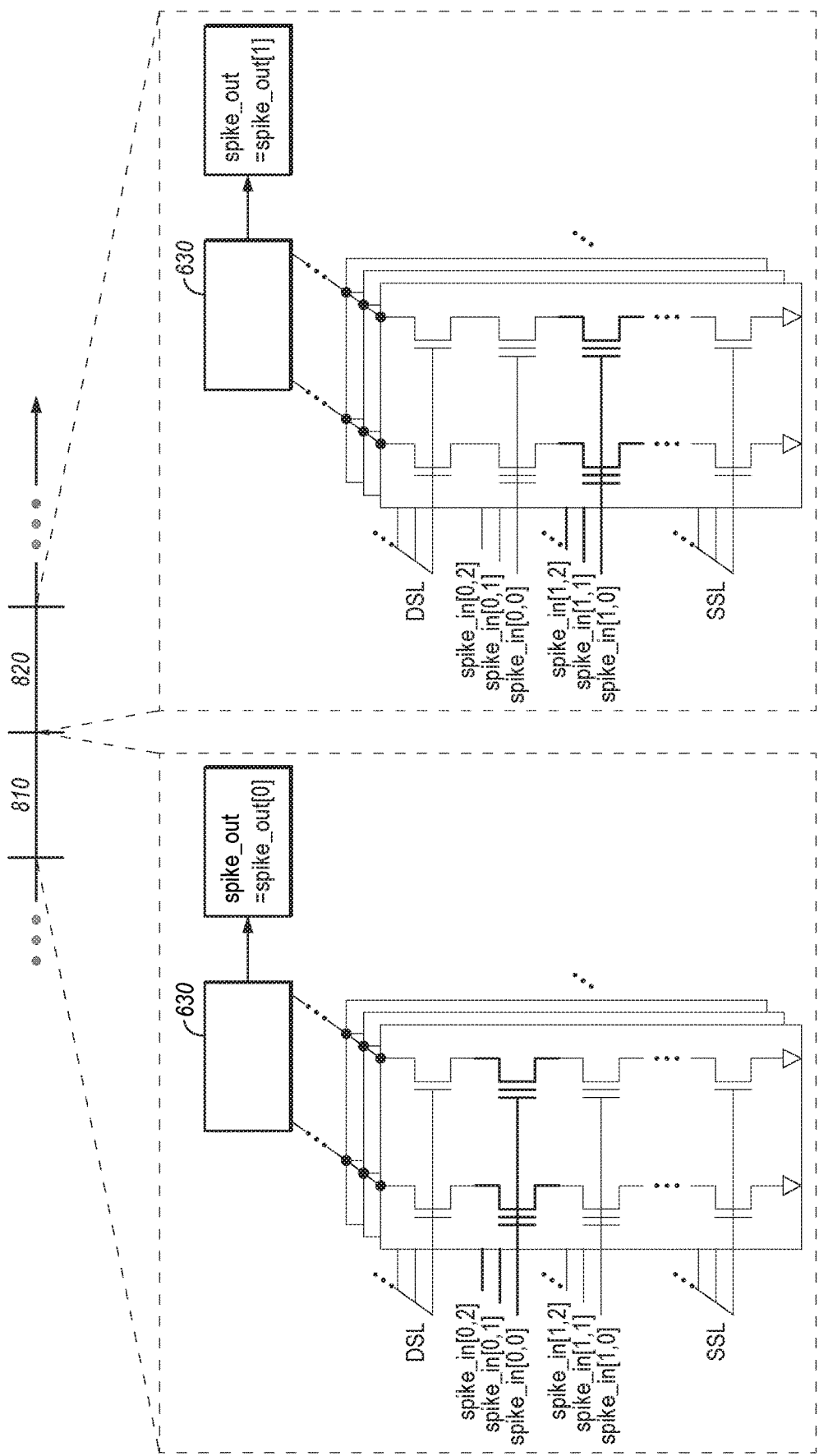
FIG. 8 illustrates an example where a synapse unit of the exemplary neuron device according to FIG. 7 operates in a time division multiplexing mode.

FIG. 8 illustrates an example where a synapse unit of the exemplary neuron device 600 according to FIG. 7 operates in the time division multiplexing mode. Although FIG. 8 illustrates neuron device 600 illustrated in FIG. 7, it will be understood by those skilled in the art that the time division multiplexing mode illustrated in FIG. 8 may be modified to be suitable for neuron device 300 illustrated in FIG. 3.

In some embodiments, time sections in the time division multiplexing mode may include a first time section 810 and a second time section 820. As illustrated in FIG. 8, during the first time section 810, FG MOSFETs in first stages within the multiple modules of the synapse unit may receive spike_in[0,0], spike_in[0,1], and spike_in[0,2], respectively. All of FG MOSFETs in the other stages of the multiple modules may receive input signals to operate as closed switches with respect to the synapse unit of neuron device 600 during the first time section in FIG. 8 in order for spike_in[0,0], spike_in[0,1], and spike_in[0,2] received during the first time section to be applied with coefficient information and then applied to output unit 630. When spike_in[0,0], spike_in[0,1], and spike_in[0,2] are applied with coefficient information and then applied to the output unit 630 during the first time section, output unit 630 may obtain a weighted sum thereof and then output spike_out[0] based on the weighted sum.

During the second time section 820 after the first time section 810, FG MOSFETs in second stages within the multiple modules of the synapse unit may receive spike_in [1,0], spike_in[1,1], and spike_in[1,2], respectively, as shown in FIG. 8. All of FG MOSFETs in the other stages of the multiple modules may receive input signals to operate as closed switches with respect to the synapse unit of neuron device 600 during the second time section in FIG. 8 in order for spike_in[1,0], spike_in[1,1], and spike_in[1,2] received during the second time section to be applied with coefficient information and then applied to output unit 630. When spike_in[1,0], spike_in[1,1], and spike_in[1,2] are applied with coefficient information and then applied to output unit 630 during the second time section, output unit 630 may obtain a weighted sum thereof and then output spike_out[1] based on the weighted sum.

Further, in some embodiments, each synapse element of the synapse unit of neuron device 600 may update coefficient information in each time section. For example, after a gate of an FG MOSFET illustrated in FIG. 8 receives an input signal, a specific potential formed within a floating gate may be updated by applying an appropriate voltage to the FG MOSFET. In some embodiments, an internal potential of output unit 630 of neuron device 600 may be reset in each time section, and after the internal potential of output unit 630 is reset, each synapse element of the synapse unit may update its coefficient information.

Figure 9:
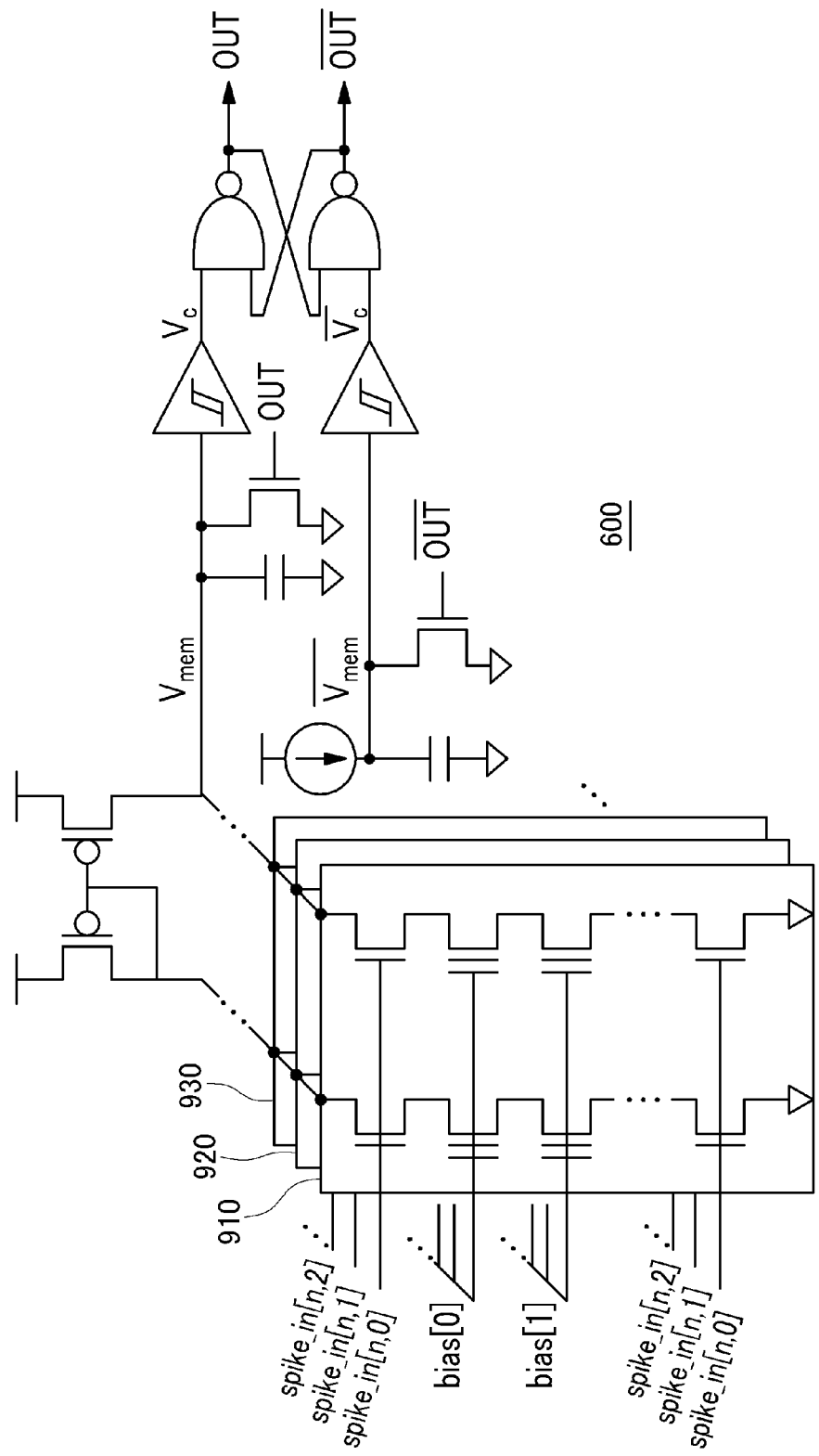
FIG. 9 is another exemplary circuit diagram of the neuron device of FIG. 6.

FIG. 9 is another exemplary circuit diagram of the neuron device of FIG. 6. The neuron device illustrated in FIG. 9 has the same circuit diagram as neuron device 600 illustrated in FIG. 7 except the layout of lines for input signals. Therefore, an explanation of the same parts as illustrated in FIG. 7 will be omitted. An input unit (not illustrated) of neuron device 600 may be configured to receive multiple input signals spike_in[n,0], spike_in[n,1], spike_in[n,2], etc. and transmit the input signals to synapse modules 910, 920, 930, etc., respectively. As illustrated in FIG. 9, the input signals spike_in[n,0], spike_in[n,1], spike_in[n,2], etc. may be transmitted to gates of MOSFETs included in synapse modules 910, 920, 930, etc., respectively. Herein, n includes 0 and positive integers. Two MOSFETs in each of the synapse modules illustrated in FIG. 9 may be arranged to receive the same input signal.

Further, each of multiple FG MOSFETs included in each of multiple modules 910, 920, 930, etc. may receive a signal indicating whether or not to read. For example, as illustrated in FIG. 9, FG MOSFETs in first stages of multiple modules 910, 920, 930, etc., respectively, may receive bias[0], and FG MOSFETs in second stages may receive bias[1]. Due to this layout of lines, lines may be simply arranged as compared with the circuit illustrated in FIG. 7, and, thus, signals in the circuit may be simplified.

Figure 10:
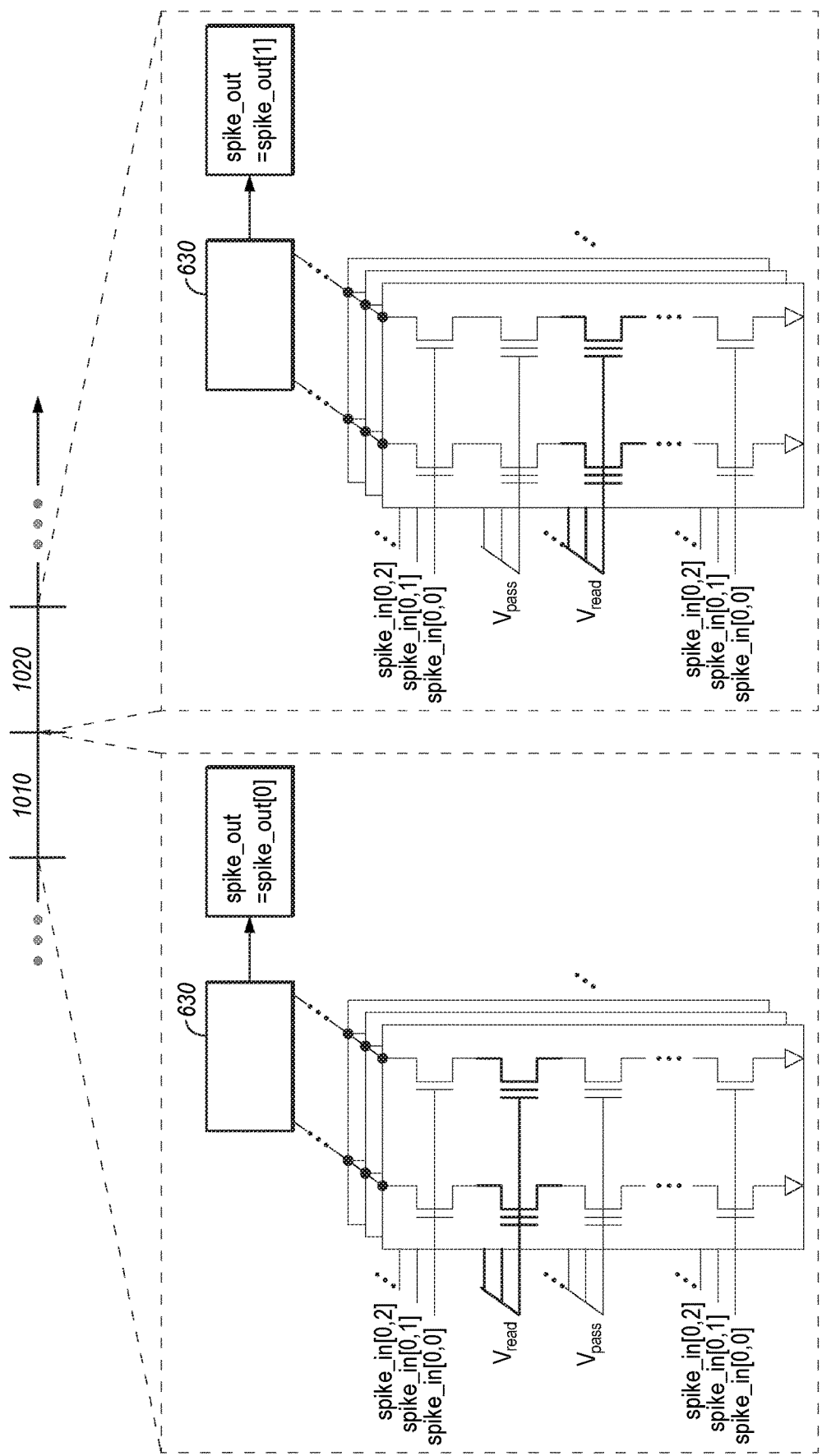
FIG. 10 illustrates an example where a synapse unit of the exemplary neuron device according to FIG. 9 operates in a time division multiplexing mode.

FIG. 10 illustrates an example where a synapse unit of the exemplary neuron device 600 according to FIG. 9 operates in a time division multiplexing mode. Although FIG. 10 illustrates neuron device 600 illustrated in FIG. 9, it will be understood by those skilled in the art that the time division multiplexing mode illustrated in FIG. 9 may be modified to be suitable for neuron device 300 illustrated in FIG. 3.

In some embodiments, time sections in the time division multiplexing mode may include a first time section 1010 and a second time section 1020. As illustrated in FIG. 10, during the first time section 1010, MOSFETs in first stages and last stages within the multiple modules of the synapse unit may receive spike_in[0,0], spike_in[0,1], and spike_in[0,2], respectively. During the first time section 1010, the FG MOSFETs in first stages within the multiple modules of the synapse unit may receive a signal bias[0]=$V_{read}$. Herein, $V_{read}$ refers to a voltage that enables information stored in an FG MOSFET to be read. During the first time section 1010, FG MOSFETs in stages other than the first stages may receive a signal $V_{pass}$. Herein, $V_{pass}$ refers to a voltage that enables its corresponding FG MOSFET to operate as a closed switch. For example, FG MOSFETs in second stages receive a signal bias[1]=$V_{pass}$.

During the second time section 1020 after the first time section 1010, the MOSFETs in the first stages and the last stages within the multiple modules of the synapse unit may receive spike_in[1,0], spike_in[1,1], and spike_in[1,2], respectively. During the second time section 1020, the FG MOSFETs in the second stages within the multiple modules of the synapse unit may receive a signal bias[1]=$V_{read}$ as illustrated in FIG. 10. During the second time section 1020, FG MOSFETs in stages other than the second stages may receive a signal $V_{pass}$. For example, the FG MOSFETs in the first stages receive a signal bias[0]=$V_{pass}$.

Figure 11:
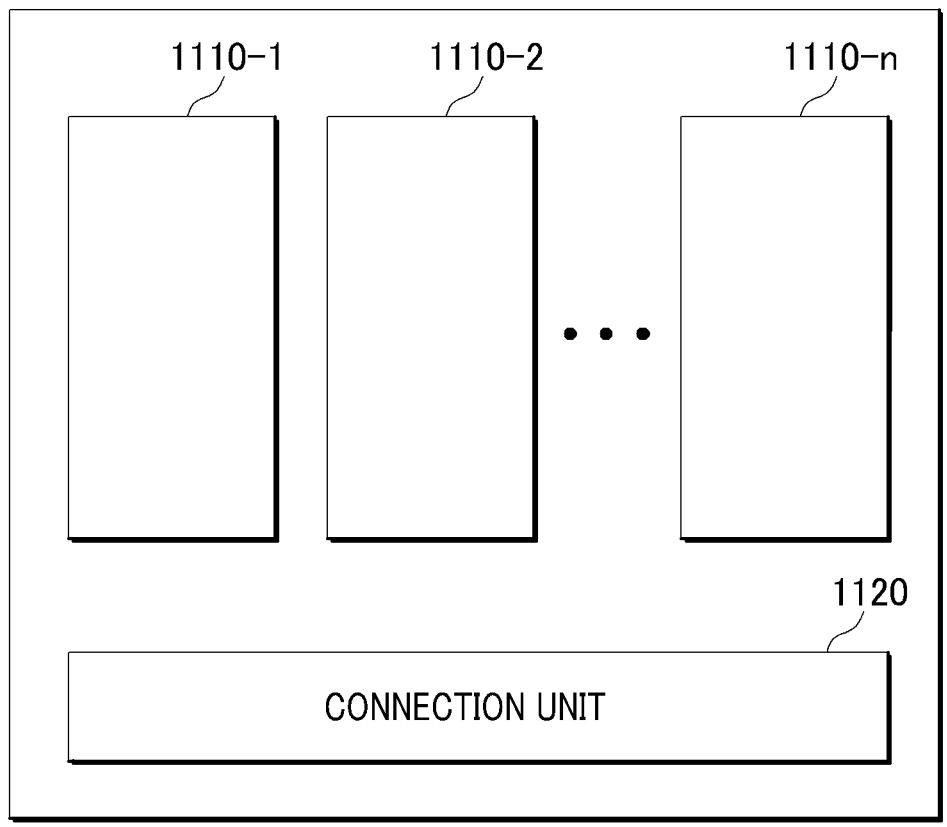
FIG. 11 is a block diagram illustrating an exemplary integrated circuit in accordance with at least some exemplary embodiments of the present disclosure.

FIG. 11 is a block diagram illustrating an exemplary integrated circuit in accordance with at least some exemplary embodiments of the present disclosure. An integrated circuit 1100 may include multiple neuron devices 1110-1, 1110-2 to 1110-n and a connection unit 1120. In some embodiments, each of multiple neuron devices 1110-1, 1110-2 to 1110-n may include: an input unit configured to receive multiple input signals; a synapse unit connected to the input unit and including one or more synapse modules; and an output unit connected to the synapse unit and configured to generate an output signal like neuron device 300 illustrated in FIG. 3 or neuron device 600 illustrated in FIG. 6. The one or more synapse modules may include multiple modules including multiple synapse elements connected in series and may be configured to operate in the time division multiplexing mode. In some examples, each of the synapse elements in the synapse unit may include an FG MOSFET and may have specific coefficient information. In each of the one or more synapse modules, one of the synapse elements connected in series may be configured to apply coefficient information to one of the received input signals. The output unit may obtain a weighted sum of the input signals to which the coefficient information is applied and generate an output signal based on the weighted sum.

In some embodiments, connection unit 1120 may be configured to interconnect multiple neuron devices 1110-1, 1110-2 to 1110-*n*. In some examples, connection unit 1120 may be configured to connect an output from one of multiple neuron devices 1110-1, 1110-2 to 1110-*n* with an input to one or more of multiple neuron devices 1110-1, 1110-2 to 1110-*n*. For example, connection unit 1120 may connect an output from neuron device 1110-1 with an input to neuron device 1110-2 and/or neuron device 1110-*n*. Connection unit 1120 may also connect output from neuron device 1110-1 with another input to neuron device 1110-1.

In some embodiments, connection unit 1120 is programmable. In some examples, connection unit 1120 may include a field programmable gate array (FPGA). Programmable connection unit 1120 may change the interconnection among multiple neuron devices 1110-1, 1110-2 to 1110-*n* without a physical process to the circuit. In some examples, connection unit 1120 may be configured to dynamically change the interconnection among multiple neuron devices 1110-1, 1110-2 to 1110-*n* during an operation of integrated circuit 1100.

There is little distinction left between hardware and software implementations of the connection unit 1120. The use of hardware or software is generally (but not always, in that in certain contexts the choice between hardware and software may become significant) a design choice representing cost vs. efficiency tradeoffs. A favorable means may vary with the context in which the processes and/or systems and/or other technologies are deployed.

The foregoing detailed description has set forth various exemplary embodiments of the devices and/or processes through the block diagrams and/or examples. Insofar as such block diagrams and/or examples contain one or more functions and/or operations, it will be understood by those skilled in the art that each function and/or operation within such block diagrams or examples can be implemented, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those skilled in the art can translate from the plural to the singular and/or from the singular to the plural as is appropriate to the context and/or application. The various singular/plural permutations may be expressly set forth herein for sake of clarity. It will be understood by those skilled in the art that, in general, terms used herein and especially in the appended claims (e.g., the appended claims) are generally intended as "open" terms (e.g., the term "including" should be interpreted as "including but not limited to," the term "having" should be interpreted as "having at least," the term "includes" should be interpreted as "includes but is not limited to," etc.).

The subject matter described herein sometimes illustrates different components contained within or connected with different other components. It is to be understood that such depicted architectures are merely exemplary and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A neuron device comprising:
   an input unit configured to receive multiple input signals;
   a synapse unit connected to the input unit and including one or more synapse modules; and
   an output unit connected to the synapse unit and configured to generate an output signal,
   wherein:
   each of the one or more synapse modules of the synapse unit includes multiple synapse elements connected in series and operates in a time division multiplexing mode,
   each of the multiple synapse elements has specific coefficient information, and
   according to the time division multiplexing mode:
   in each of the one or more synapse modules, a first one of the multiple synapse elements is configured to apply first coefficient information to one of the received multiple input signals in a first time section and a second one of the multiple synapse elements is configured to apply second coefficient information to one of the received multiple input signals in a second time section different from the first time section; and
   the output unit obtains a weighted sum of the input signals to which the coefficient information is applied and generates an output signal based on the weighted sum.

2. The neuron device of claim 1, wherein the multiple input signals are pulse signals.

3. The neuron device of claim 1, wherein the multiple input signals are analog signals.

4. The neuron device of claim 1, wherein the multiple input signals may be digital signals.

5. The neuron device of claim 1, wherein the input unit is configured to receive an input signal in each time section of a plurality of time sections according to the time division multiplexing mode.

6. The neuron device of claim 1, wherein the input unit is configured to directly transmit an input signal to each synapse element.

7. The neuron device of claim 6, wherein the input unit is configured to transmit, according to the time division multiplexing mode, input signals to the other synapse elements than the synapse element applying the coefficient information, wherein the input signals to the other synapse elements is to operate the other synapse elements as closed switches.

8. The neuron device of claim 1,
wherein the input unit is configured to transmit an input signal to each of the one or more synapse modules,
wherein, according to the time division multiplexing mode:
each of the synapse elements applying the coefficient information is configured to receive a read signal that enables coefficient information to be read and apply the coefficient information to an input signal transmitted to a corresponding synapse module, and
the other synapse elements than the synapse elements applying the coefficient information are configured to receive a pass signal to operate the other synapse elements as closed switches.

9. The neuron device of claim 1, wherein each synapse element in the synapse unit is configured to update the coefficient information in each time section of a plurality of time sections according to the time division multiplexing mode.

10. The neuron device of claim 1, wherein each of the multiple synapse elements include a floating gate metal oxide silicon field effect transistor (MOSFET).

11. The neuron device of claim 1, wherein the output unit is configured to generate an output signal in each time section of a plurality of time sections according to the time division multiplexing mode.

12. The neuron device of claim 1, wherein the output unit is configured to generate the output signal when the weighted sum exceeds a threshold value.

13. The neuron device of claim 1, wherein the coefficient information of each of the multiple synapse elements has a positive value or a negative value.

14. The neuron device of claim 1, wherein the synapse elements connected in series are configured to form a NOT-AND (NAND) flash structure.

15. An integrated circuit comprising:
multiple neuron devices according to claim 1; and
a connection unit configured to interconnect the multiple neuron devices.

16. The integrated circuit of claim 15, wherein the connection unit is programmable.

17. The integrated circuit of claim 15, wherein the connection unit is configured to dynamically change the interconnection among the multiple neuron devices.

* * * * *